United States Patent [19]

Nishio et al.

[11] Patent Number: 5,028,363
[45] Date of Patent: Jul. 2, 1991

[54] METHOD OF CASTING POWDER MATERIALS

[75] Inventors: Hiroaki Nishio; Takeshi Kawashima; Yoshio Takagi, all of Yokohama, Japan

[73] Assignee: NKK Corporation, Tokyo, Japan

[21] Appl. No.: 465,945

[22] Filed: Jan. 16, 1990

Related U.S. Application Data

[63] Continuation-in-part of Ser. No. 141,010, Jan. 5, 1988, abandoned.

[51] Int. Cl.⁵ ............................................. C04B 41/00
[52] U.S. Cl. ..................... 264/28; 264/344; 419/61; 419/66
[58] Field of Search ............. 264/28, 344; 419/61, 419/66

[56] References Cited

U.S. PATENT DOCUMENTS 4,428,895  1/1984  Blasch et al. ...................... 264/28
4,731,208  3/1988  Nakajima et al. .................. 264/28

FOREIGN PATENT DOCUMENTS 0161494  11/1985  European Pat. Off. .
0161855  11/1985  European Pat. Off. .
0202852  11/1986  European Pat. Off. .
0206685  12/1986  European Pat. Off. .
61-261274 11/1986  Japan .
61-287702 12/1986  Japan .

*Primary Examiner*—James Derrington
*Attorney, Agent, or Firm*—Michael N. Meller

[57] ABSTRACT

A method of casting a powdered material. A slurry is formed by dispersing metal powder or ceramic powder into a dispersing medium mainly consisting of a substance extractable by a liquid or supercritical carbon dioxide and having a melting point between 0° C. and 100° C., and the slurry is poured into a liquid non-absorbing mold where the slurry is cooled to freeze and solidify into a molding. The main constituent of the dispersing medium in the molding is extracted and removed by the liquid or supercritical carbon dioxide.

11 Claims, 1 Drawing Sheet

METHOD OF CASTING POWDER MATERIALS

This is a continuation-in-part of U.S. Ser. No. 141,010 filed Jan. 5, 1988 now abandoned.

BACKGROUND OF THE INVENTION

The present invention relates to a method of casting powder so designed that metal powder or ceramic powder is dispersed into a dispersing medium to form a slurry and the slurry is cast.

A casting method has been known in the art as a method of molding metal powders such as 2% Ni-98% Fe powder, SUS 316 powder and stellite powder, ceramics such as alumina, silicon carbide, silicon nitride, zirconium, molybdenum carbide and titanium carbide, and mixed powders of ceramics and metals such as tungsten carbide-cobalt and titanium carbide-nickel. This method is one in which a starting powder is dispersed into a dispersing medium to form a slurry and the slurry is poured into a mold having liquid absorbing properties, thus causing the mold to absorb a part of the dispersing medium and form a cast thickness and thereby producing a molding.

In this case, the starting powder used is ground and mixed with a dispersing medium such as water and a small amount of a dispersing agent in a ball mill to form slurry, and in this case the slurry was stabilized by stirring the mixture for several days, adjusting the water content and viscosity and then subjecting to vacuum defoaming.

On the other hand, a gypsum mold subjected to preliminary mold processings such as the application of a mold release agent is assembled and the slurry prepared in the above-mentioned manner is poured into the mold, thereby forming a cast thickness along the mold area due to the absorption of the water by the mold and growing the cast thickness with time.

With the slurry poured into the mold, the mold continues to absorb the water and the water content of the cast thickness is decreased gradually. Thus, the casting is increased in hardness and it is also shrunk, thereby permitting its release from the mold.

At this stage, the casting is removed from the mold so that if necessary, the casting is dried after it has been processed in the raw state. On the other hand, the gypsum mold which has absorbed the water is dried for repeated use.

As the dispersing medium used in preparing the slurry, it is known to use various alcohols in place of water.

Also, it is known to use a permeable mold made from a mold material other than gypsum, e.g., a plastic material which is excellent in mechanical strength and wear resistance, a metal-ceramic fiber composite material or ceramic material such as silicon carbide.

In addition, a mold of compressed powder material is formed by inserting a mold core, ramming powder material and then removing the mold core and the removal of a casting from the mold is effected by knocking down the mold to restore the compressed powder material to the original powder form. The restored powder material is dried and used repeatedly.

This type of casting method for powdered metals and ceramics has the following disadvantages.

(1) The operations including from the casting to the removal from the mold requires a long period of time. While the required time is dependent on the shape, size, etc. of a desired molding and thus we cannot absolutely say so, eight hours is required for casting a water-type slurry of alumina into a cylindrical shape of 12 mm$\phi \times$20 mm, for example.

(2) The drying operation of a molding requires a long period of time. For instance, twenty-four hours are required for air drying the above-mentioned molding.

(3) A mold drying operation is necessary. In addition, this operation requires a long period of time. Therefore, this operation should preferably be eliminated.

(4) The drying operation tends to cause a distortion or cracks in the molding. The reason is that the dispersion liquid is vaporized from the surface of the molding and lost, thus causing voids inside the molding so that a capillary force acts at the vapor-liquid surfaces and the vapor-solid-liquid points therein and the adjacent particles attract one another. This phenomenon causes the shrinkage of the molding to proceed from the surface layer portion and tends to cause a distortion or cracks in the molding.

To overcome the above disadvantages (2) and (4), the applicant has applied for patents on powder molding methods via Japanese Patent Applications No. 60-261274) and No. 60-129960 (b) (Laid-Open Specification No. 61-287702). The powder molding method of Patent Application No. 60-100433 is a powder molding method in which the dispersing medium used in the molding of a molded shape from metal or ceramic powder by casting is extracted and removed in a supercritical carbon dioxide atmosphere and the major constituent of the dispersing medium is extracted and removed by a supercritical carbon dioxide. The powder molding method of Patent Application No. 60-129960 (Laid-Open Specification No. 61-287702) is one which is characterized in that the dispersing medium used in the molding of a molded shape from metal or ceramic powder by casting is extracted and removed by a liquid carbon dioxide of a temperature which is not less than $-30°$ C. and not more than 31.1° C., that is, the dispersing medium is extracted and removed by a liquid carbon dioxide of a temperature immediately below the critical temperature or a temperature range between $-30°$ C. and 31.1° C. and the carbon dioxide is removed by the succeeding pressure reduction. In accordance with this method the dispersing medium removing time is greatly reduced to 1.5–2.0 hours in the case of a molding of 12 mm$\phi \times$20 mm, for example.

Further, in the method of the former (a) the supercritical carbon dioxide has no surface tension so that during the reduced-pressure vaporization operation following the replacement of the dispersing medium, no capillary force acts in the molding thus causing no distortion or cracks in the molding. Also, in accordance with he latter method, during the reduced-pressure vaporization operation there are the occurrence of vapor-liquid interfaces and the action of capillary force and therefore there is the possibility of causing a distortion or cracks in the molding unless a considerable amount of time is spent.

It will thus be seen that while the method disclosed in the former (a) overcomes the disadvantages stated in the above (2) and (4), the disadvantages of the above (1) and (3) still remain unsolved. On the other hand, the method disclosed in the latter (b) has a problem with respect to the operation of removing the liquid carbon dioxide from the molding so that while the disadvantage of the above (1) and (2) still remain unsolved and the disadvantage of the above (4) is not overcome completely.

As described hereinabove, the conventional cast molding methods of powder materials have various disadvantages.

SUMMARY OF THE INVENTION

It is an object of the present invention to provide a powder casting method which improves upon the powder molding methods disclosed in Japanese Patent Applications No. 60-100433 (Laid-Open Specification No. 61-261274) and No. 60-129960 (Laid-Open Specification No. 61-287702) and which is capable of removing the major part of a dispersing medium in a short period of time without causing any detrimental effect on a molding produced by the slurry casting technique.

DESCRIPTION OF THE PREFERRED EMBODIMENTS

Figure 1:
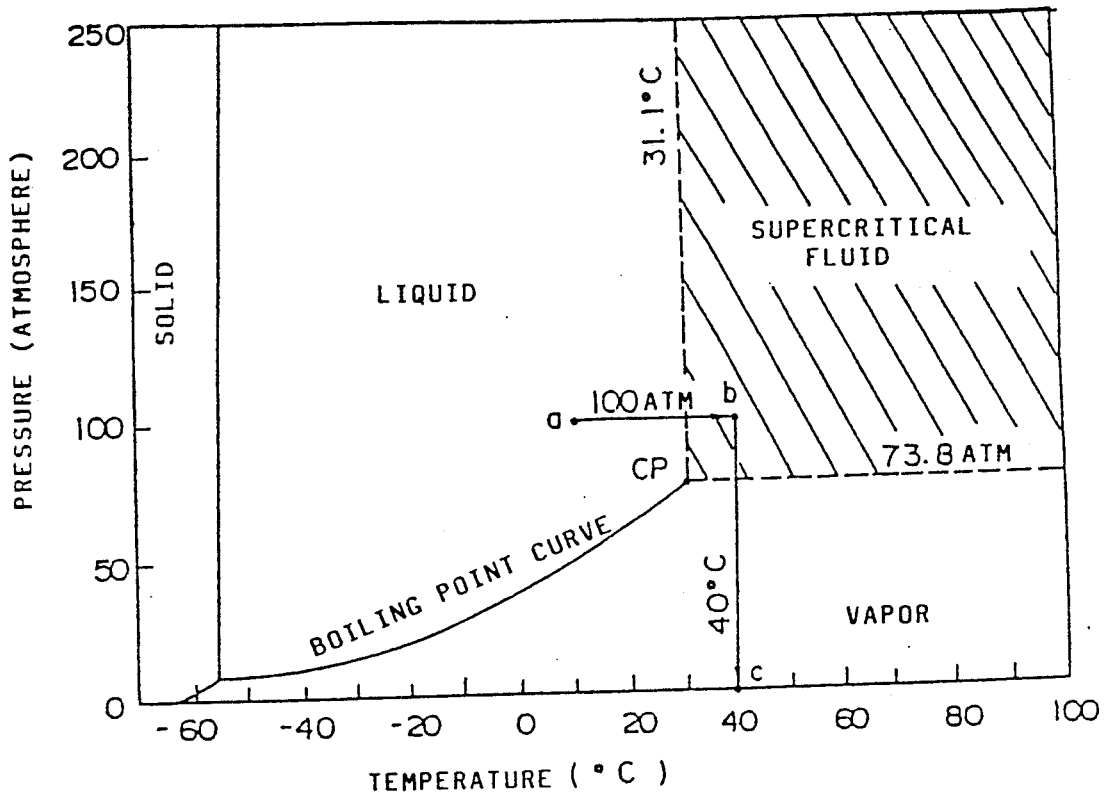
FIG. 1 is a pressure-temperature diagram of carbon dioxide.

According to the invention, the foregoing deficiencies in the conventional slurry casting techniques are overcome by the provision of a novel casting method of powder materials.

Thus, in accordance with the invention there is provided a powder casting method comprising forming a slurry by dispersing metal powder or ceramic powder into a dispersing medium mainly consisting of a substance having a melting between 0° C. and 100° C. and extractable by a liquid or supercritical carbon dioxide, pouring the slurry into a liquid non-absorbing mold, cooling the slurry to freeze and solidify and then remove it as a molding from the mold, and then extracting and removing the major part of the dispersing medium in the molding by a liquid or supercritical carbon dioxide.

In accordance with the powder casting method of this invention, a liquid non-absorbing mold is used in place of the conventional liquid absorbing mold and also a substance which is adapted for supercritical extraction by carbon dioxide and solidifiable at a temperature in the range from 0° to 100° C. is used as a dispersing medium. By combining this dispersing medium and a freezing phenomenon of a slurry, the required molding time is reduced to 1 minute as compared with the previous molding time of 8 hours and also the mold drying operation requiring 24 hours is eliminated. In addition, the disadvantage of the prior art techniques, i.e., the danger of causing a distortion, cracks or the like in a molding is overcome by varying the temperature and pressure so as to bypass the boiling point such that the boiling point curve in the pressure-temperature diagram is not crossed when exhausting the liquid carbon dioxide substituting the dispersing medium after the extraction and removal of the dispersing medium.

While various substances which are extractable by a liquid or supercritical carbon dioxide and having melting points between 0° C. and 100° C. may be used for the dispersing medium used in the method of this invention, these substances include methyl carbonate (melting point 0.5° C.), t-butyl alcohol (melting point 25.6° C.), stearyl alcohol (melting point 59° C.), stearic acid (melting point 70.1° C.), paraffin wax (melting point 40°-90° C.), etc., and these substances come within the scope of coverage of the invention. In this connection, if the melting point is excessively low, there is the disadvantage of requiring large-scale equipment for the production of a low temperature refrigerant for slurry freezing and solidifying purposes. On the contrary, if the melting point is excessively high, there is the disadvantage of increasing the amount of slurry adhesion upon the stoppage of the equipment thus making its cleaning more troublesome. Thus, it is preferable to use a substance having a melting point in the range from 0° C. to 100° C. as the main constituent of the dispersing medium.

While the conventional casting imparts a molding strength to a molding owing to the liquid absorption of a mold, the molding strength is imparted by the freezing of the dispersing medium in the casting method of powder according to the invention. While the time required for the freezing differs depending on the melting point of a dispersing medium, the temperature of a refrigerant and the size of a molding, it is greatly reduced to less than 1 minute as compared with eight hours required by the conventional methods.

As regards the viscosity range of the slurry immediately before its pouring into the liquid non-absorbing mold, if the viscosity is low, while its pouring into the mold of a complicated shape is easy, a solid-liquid separation tends to occur and also the molding tends to break after the removal of the dispersing medium. Thus, the lower limit of the viscosity range should preferably be 50 c poise or over. On the contrary, if the viscosity is high, while the occurrence of a solid-liquid separation tends to become difficult, the flowability is deteriorated and the pouring into the mold of a complicated shape is made difficult. Therefore, the upper limit of the viscosity range should preferably be 104 c poise or less.

It is desirable that the powder concentration of the slurry is high so that the flowability of the slurry is not deteriorated and the concentration of the dispersing medium to be removed at the following stage is maintained low. While the powder concentration is in the range from 40 to 75 volume % and the dispersing medium is from 60 to 25 volume %, in the case of the ordinary particle size distribution and the concentration can be increased by adjusting the particle size distribution, this is accompanied by an increase in the viscosity of the slurry and the flowability is deteriorated. After the slurry has been poured under pressure along with the increase in the powder concentration, it is an effective means to hold a certain pressurizing force immediately after the completion of the pouring. In this case, however, the application of an excessively large pressuring force not only causes separation between the solid and the liquid within the liquid non-absorbing mold thus making nonuniform the density of the molding but also causes the liquid to leak, along with the powder, to the mating surface of the mold, thereby giving rise to such problems as scoring of the mold and the necessity to perform a mold cleaning operation. As a result, the holding pressure immediately after the slurry pouring should preferably be 10 $Kg/cm^2$ or less.

The liquid non-absorbing mold may be of an external atmosphere cooling type or of a type having an internal circuit for a refrigerating medium. While, in the case of the convention injection molding employing a high pressure of 300 to 1600 $Kg/cm^2$ as the holding pressure, an expensive tool steel is used as the mold material in consideration of the resistance to wear, the method of the present invention is a low-pressure molding and therefore inexpensive materials such as wood, hard rubber, aluminum and stainless steel may be used for the material of the mold.

By using the liquid non-absorbing mold in place of the liquid absorbing mold used in the conventional casting methods, it is possible to eliminate the mold drying operation requiring a long period of time.

To improve the flowability of the slurry and impart a holding strength to the molding after the extraction and removal of the major part of the dispersing medium, a binding agent, plasticizing agent, dispersing agent, wetting agent, lubricant, etc., may be suitably added to the substance extractable by the liquid or super-critical carbon dioxide. As the suitable binding agent, cellulose acetate butyrate, nitrocellulose, petroleum resin, polyethylene, polyacrylic ester, polymethyl methacrylate, polyvinyl alcohol, polyvinyl butyral, vinyl chloride, polymethacrylic ester, ethyl cellulose, abietic resin, etc., may be used. Suitable materials for use as the plasticizing agent include butyl benzyl phthalate, dibutyl phthalate, butyl phthalate, dimethyl phthalate, methyl acetate, mixtures of phthalic ester, derivatives of polyethylene glycol, tricresyl phosphate, etc. As the dispersing agent, glycerin trioleate, natural fish oil, synthetic surface active agents, benzenesulfonic acid, oleic acid, methyl octadiene, etc., may be used. Suitable materials for use as the wetting agent include alkyl aryl polyether alcohol, ethyl ether of polyethylene glycol, ethyl phenylglycol, polyoxyethylene ester, monooleic glycerin, trioleic glycerin, alcohols, etc. As the lubricant, stearic acid, stearyl alcohol, etc., may be used. In this case, the alcohols, stearic acid, stearyl alcohol, etc., can also be extracted and removed from the liquid or supercritical carbon dioxide.

Where the freezing temperature of the dispersing medium in the molding is lower than the critical temperature (31.1° C.) of carbon dioxide, the supercritical extraction requires that the molding is thawed by heating it to a temperature above the critical temperature. If this thawing makes it difficult to maintain the shape of the molding, it is preferable to choose the extraction effected by the liquid carbon dioxide at a temperature lower than the critical temperature without effecting the thawing. For instance, where the main constituent of the dispersing medium consists of t-butyl alcohol (melting point 25.6° C.), while the melting point is varied more or less by the addition of a binding agent, plasticizing agent, dispersing agent, lubricant, etc., the melting point is lower than the critical temperature of 31.1° C. and therefore it is desirable to select the extraction by the liquid carbon dioxide depending on the conditions.

As regards the pressure during the extraction, the lower limit must be above a lower limit pressure sufficient to maintain the phase for both of the liquid and supercritical fluids and the upper limit is 500 atmospheres, preferably 300 atmospheres. Any excessive pressure uselessly wastes energy without increasing the extraction efficiency.

The t-butyl alcohol in the molding is extracted by the liquid carbon dioxide, e.g., the liquid carbon dioxide of 10° C. and 100 atmospheres and the resulting voids in the molding are replaced with the liquid carbon dioxide. Thereafter, when the carbon dioxide is discharged while maintaining it at 10° C. and the pressure is reduced, vaporization takes place at around 50 atmospheres so that the vapor-liquid interfaces of the carbon dioxide are caused in the molding and a capillary force acts at the voids, thereby causing movement of the particles with the resulting shrinkage of the molding. At this time, a distortion, cracks or breaking of the molding is caused depending on the conditions.

To avoid this deficiency, it is necessary to present the formation of such vapor-liquid interfaces. As shown in the pressure-temperature diagram of carbon dioxide in FIG. 1, no vapor-liquid equilibrium line is present when the critical pressure is higher than 73.8 atmospheres and the critical temperature is higher than 31.1° C.. As a result, the formation of vapor-liquid interfaces can be prevented by performing the pressure reducing operation so as to bypass the critical point CP without crossing the boiling point curve. In other words, while maintaining the pressure at 100 atmospheres, the liquid carbon dioxide is heated to 40° C. from a point (a) of 10° C. and 100 atmospheres thereby attaining a point (b) where the temperature is 40° C. and the pressure is 100 atmospheres and then the pressure is reduced to the atmospheric pressure while maintaining the temperature at 40° C. thereby attaining a point (c) where the temperature is 40° C. and the pressure is 1 atmosphere. In other words, as shown by the hatching in FIG. 1, it is desirable to change the carbon dioxide from the liquid state to the vapor state so as to pass through the region where the pressure is between 73.8 and 250 atmospheres and the temperature is between 31.1° C. and 100° C. thereby exhausting the carbon dioxide. In this case, the lower limits of the pressure and the temperature correspond to the critical pressure and the critical temperature, respectively, and constitute the requisite conditions for bypassing the critical point. Also, increasing the pressure and the temperature over the upper limits is disadvantageous in that not only they become remoter from the critical point but also the energy loss is increased.

While, in this exemplary case, the pressure is maintained constant between the points (a) and (b) and the temperature is maintained constant between the points (b) and (c), it is not always necessary to maintain the pressure or the temperature constant. With the method of this invention, it is essential that the carbon dioxide is changed to the vapor state from the liquid state through the supercritical fluid state.

While it has been illustrated that to pour the slurry under pressure so far as causing no separation between the solid and the liquid is much effective on the slurry in which the density of the high viscosity powder is high and hence the amount of the dispersing medium requiring the removal is small, the pressure application of 10 Kg/cm$^2$ or less is preferred from the standpoint of solid-liquid separation prevention in the ordinarily attainable range of 40 to 75 volume %.

As regards the viscosity, the present invention is operable in a particularly effective manner in the range between 50 and 104 c poise. If the viscosity is lower than the lower limit value, the solid-liquid separation is caused easily, whereas if the viscosity is higher than the upper limit value, difficulties are caused in the molding of complicated shapes even if the pressure application is used concurrently.

The method according to the invention will now be described in greater detail with reference to the following examples and comparative examples.

EXAMPLE 1

An example of the method of the invention will now be described with reference to FIG. 2. A slurry of silicon nitride (Si$_3$N$_4$) powder was formed with the composition shown in Table 1. Firstly, 1.6 parts by volume of Y$_2$O$_3$ as a sintering assistant, 2.2 parts by volume of Al$_2$O$_3$, 54.5 parts of volume of t-butyl alcohol and 0.4 parts by volume of glycerin trioleate as a dispersing agent were added to 39.2 parts by volume of Si$_3$N$_4$ and mixed for 24 hours in a ball mill. Then, the thus formed slurry was transferred into a closed agitating tank 1 of FIG. 2 where 1.4 parts by volume of polyvinyl butyral as a binding agent and 0.7 parts by volume of polyethylene glycol as a plasticizing agent were added and agitated for mixing for 2 hours with the temperature being adjusted to 30° C..

TABLE I

| Raw Materials | Composition (parts by volume) | |
|---|---|---|
| Si$_3$N$_4$ (average particle size 0.75 μm) | 39.2 | 40.8 |
| Y$_2$O$_3$ (average particle size 0.80 μm) | 1.6 | |
| Al$_2$O$_3$ (average particle size 1.20 μm) | 2.2 | 59.2 |
| Glycerin trioleat | 0.4 | |
| Polyvinyl butyral | 1.4 | |
| Poly ethylene glycol | 0.7 | |
| t-Butyl alcohol | 54.5 | |
| Total | 100.0 | |
| Viscosity (30° C., shear rate 100s$^{-1}$) | 1.4 × 10$^2$ c poise | |

The formed slurry was sampled and the viscosity at 30° C. was measured, thus showing 1.4×10$^2$ c poise.

Figure 2:
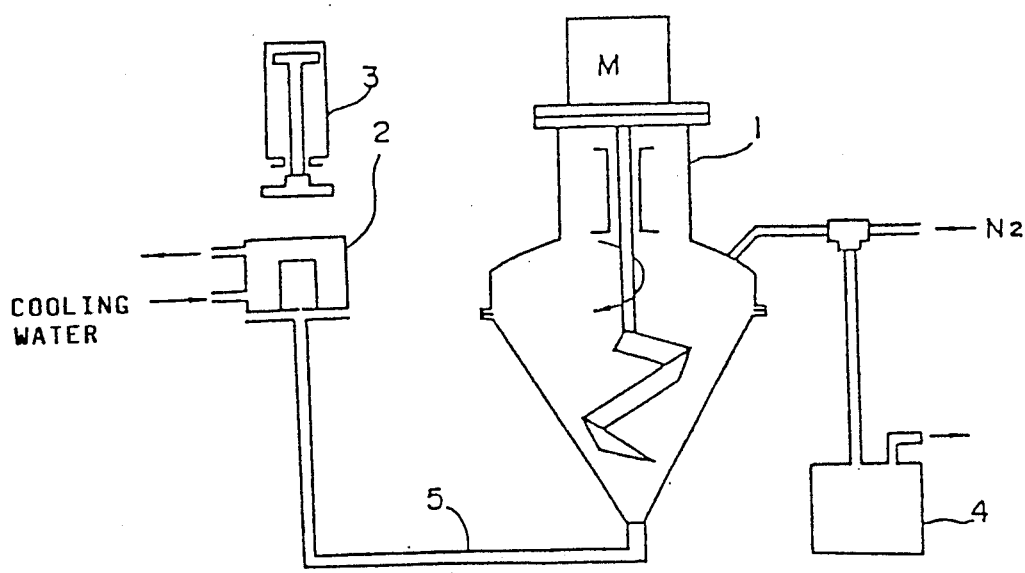
FIG. 2 is a flow diagram for performing a method according to the present invention.

On the other hand, as shown in FIG. 2, a mold 2 having an aluminum water-cooled jacket and a cavity of 12 mmφ×20 mm was fixed in place by an air cylinder 3 and was cooled by cooling water of 5° C.

After the slurry had been subjected to suction defoaming by a vacuum pump 4, under the application of a nitrogen pressure having a gage pressure of 0.3 Kg/cm$^2$ the slurry was poured into the mold 2 through a feed pipe 5 heated to 30° C. After maintaining the gage pressure of 0.3 Kg/cm$^2$ for 1 minute, the internal pressure of the closed agitating tank 1 was restored to the atmospheric pressure and the air cylinder 3 was lifted, thereby removing the molding from the mold. The molding was in a completely solidified state and there was no solid-liquid separation, thereby proving its soundness.

The cylindrical molding produced in this way was held in a separate extraction tank and a liquid carbon dioxide preheated to 40° C. was fed into the extraction tank. Then, while circulating the supercritical carbon dioxide of 100 atmospheres and 40° C. within the extraction tank and maintaining it at 100 atmospheres and 40° C., the t-butyl alcohol in the molding was extracted and removed. Then, the supply of the carbon dioxide was stopped and the closed agitating tank 1 was exhausted while maintaining the internal temperature at 40° C., thereby restoring the internal pressure to the atmospheric pressure in 1 hour.

After undergoing the above-mentioned dispersing medium removing operation, the resulting molding showed no changes such as cracks and deformation and also it was found that the difference between the weights of the molding before and after the removal of the dispersing medium corresponded substantially to the amount of the t-butyl alcohol used.

EXAMPLE 2

A slurry of powdered stainless steel was prepared with the composition shown in Table 2. Firstly, 51.6 parts by volume of t-butyl alcohol and 0.6 parts by volume of glycerin oleate as a dispersing agent were added to 40.1 parts by volume of the powdered stainless steel and were mixed for 24 hours in a ball mill.

TABLE 2

| Raw Materials | Composition (parts by volume) |
|---|---|
| SUS 316 (5-20 μm) | 40.1 |
| Glycerin Oleate | 0.6 |
| Polyvinyl butyral | 5.3 |
| di-butyl phthalate | 2.4 |
| t-butyl alcohol | 51.6 |
| Total | 100.0 |
| Viscosity (30° C., shear rate 100s$^{-1}$) | 9.3 × 10$^2$ c poise |

The prepared slurry was transferred into the closed agitating tank 1 shown in FIG. 2 and 5.3 parts by volume of polyvinyl butyral as a binding agent and 2.4 parts by volume of dibutyl phthalate as a plasticizing agent were added and were agitated for mixing for 2 hours with the temperature being adjusted to 30° C. The thus formed slurry was sampled to measure the viscosity and the measured viscosity was 9.3×10$^2$ c poise.

After the slurry had been suctioned and defoamed by the vacuum pump 4, under the application of a nitrogen pressure having a gage pressure of 3.0 Kg/cm$^2$ the slurry was poured into the same mold 2 (cooled at 5° C.) as in Example 1 through the feed pipe 5 heated to 30° C. After the gage pressure of 3.0 Kg/cm$^2$ had been maintained for 1 minute, the internal pressure of the closed agitating tank 1 was restored to the atmospheric pressure and the air cylinder 3 was lifted, thereby removing the molding from the mold. The molding was completely solidified and there was no solid-liquid separation, thus proving the soundness of the molding.

The cylindrical molding produced in this way was subjected to supercritical extraction under the same conditions as in the case of Example 1 and the molding showed no changes such as cracks and deformation. Also, it was found that the difference between the weights before and after the removal of the dispersing medium corresponded substantially to the amount of the t-butyl alcohol used.

EXAMPLE 3

A mixed powder slurry of tungsten carbide (WC) and cobalt (Co) was prepared with the composition shown in Table 3. Firstly, 47.4 parts by volume of t-butyl alcohol and 1.1 parts by volume of glycerin trioleate were added to 34.4 parts by volume of WC and 6.5 parts by volume of Co and were ground for mixing for 48 hours in a small ball mill employing hard metal balls and a hard metal lining.

TABLE 8

| Raw Materials | Composition (parts by volume) | |
|---|---|---|
| WC (average particle size 1.5 μm) | 34.4 | 40.9 |
| Co (average particle size 1.3 μm) | 6.5 | |
| Glycerin trioleate | 1.1 | 59.1 |
| Polyvinyl butyral | 6.9 | |
| Stearic acid | 3.7 | |
| t-butyl alcohol | 47.4 | |

TABLE 8-continued

| Raw Materials | Composition (parts by volume) |
| --- | --- |
| | Total 100.0 |
| Viscoity (30° C., shear rate 100s$^{-1}$) | 3.2 × 10$^3$ c poise |

The formed slurry was transferred into the closed agitating tank 1 shown in FIG. 2 and 6.9 parts by volume of polyvinyl butyral as a binding agent and 3.7 parts by volume of stearic acid were added. Then, the temperature was adjusted to 30° C. and the materials were stirred and mixed for 2 hours. The thus produced slurry was sampled to measure the viscosity and the viscosity was 3.2 × 10$^3$ c poise.

After the slurry had been subjected to suction defoaming by the vacuum pump 4, under the application of a nitrogen pressure or gage pressure of 7.0 Kg/cm$^2$ the slurry was poured into the same mold 2 (cooled at 5° C.) as in the case of Example 1 through the feed pipe 5 heated to 30° C. After holding the gage pressure of 7.0 Kg/cm$^2$ for 1 minute, the internal pressure of the closed agitating tank 1 was restored to the atmospheric pressure and the air cylinder 3 was lifted, thereby removing the molding from the mold. The molding was solidified completely and there was no separation between the solid and the liquid, thus proving the soundness of the molding.

The thus produced cylindrical molding was held in an extraction tank and a liquid carbon dioxide adjusted to a temperature of 10° C. was fed into the extraction tank thereby filling the extraction tank with the liquid carbon dioxide of 100 atmospheres and 10° C. After the t-butyl alcohol and stearic acid in the molding had been extracted and removed while circulating and maintaining the carbon dioxide at 100 atmospheres and 10° C. for 2 hours, the supply of the carbon dioxide was stopped and the carbon dioxide was heated to 40° C. while maintaining it at 100 atmospheres. Then, while maintaining the temperature at 40° C., the extraction tank was exhausted and its internal pressure was restored to the atmospheric pressure of 1 hour.

The moldings subjected to the above-mentioned dispersing medium removing operation showed, without exception, no such changes as cracks and distortion and also it was found that the difference between the weights of each molding before and after the removal of the dispersing medium corresponded substantially to the total amount of the t-butyl alcohol and stearic acid used.

COMPARATIVE EXAMPLE 1

A WC-Co cylindrical molding produced by the casting of the same procedure as Example 3 was held in an extraction tank and a liquid carbon dioxide preheated to 40° C. was fed into the extraction tank thereby filling it with the supercritical carbon dioxide of 100 atmospheres and 40° C. Then, while circulating and maintaining the carbon dioxide at 100 atmospheres and 40° C. for 1 hour, the t-butyl alcohol in the molding was removed by extraction. Then, the supply of the carbon dioxide was stopped and, while maintaining the tank internal temperature at 40° C., extraction tank was exhausted and restored to the atmospheric pressure in 1 hour.

While the moldings undergoing the above-mentioned dispersing medium removing operation were successful in removing the dispersing medium, the moldings showed cracks and deformation. This was due to the fact that the heating and maintaining at 40° C. caused melting of the dispersing medium thus making it difficult to maintain the shape of the moldings containing the high density WC.

COMPARATIVE EXAMPLE 2

The casting was effected by using the sample procedure as Example 3 and the extraction operation was performed by means of a liquid carbon dioxide of 100 atmospheres and 10° C. Then, when the internal pressure was restored to the atmospheric pressure from 100 atmospheres while maintaining the internal temperature at 10° C., the dispersing medium was removed successfully but the molding shrank somewhat and the presence of cracks was observed. This was due to the fact that when the pressure attained about 50 atmospheres, vapor-liquid interfaces were caused and there was the occurrence of a capillary force.

What is claimed is:

1. A method of molding metal powder or ceramic powder comprising the steps of:
    forming a slurry by dispersing metal powder or ceramic powder into a dispersing medium mainly consisting of a substance extractable by a liquid or supercritical carbon dioxide and having a melting point between 0 and 100° C.; wherein said slurry has a viscosity of from 50 to 144 c poise and wherein the powder concentration of the slurry is from 40 to 75 volume percent and the dispersing medium is from 60 to 25 volume percent;
    pouring said slurry into a liquid non-absorbing mold and applying a pressure of from 0.3 to 10 Kg/cm$^2$ to said slurry immediately after the pouring thereof and maintaining said pressure;
    cooling said slurry to freeze and solidify to form a molding;
    removing said molding from said mold; and
    extracting and removing a major constituent of said dispersing medium by a liquid or supercritical carbon dioxide and wherein the liquid carbon dioxide is exhausted by changing said liquid carbon dioxide from the liquid state to a vapor state so as to form no vapor-liquid interfaces and passing through a region of pressures between 73.8 and 250 atmospheres and temperatures between 31.1° and 100° C.

2. A method of molding powder according to claim 1 wherein said metal powder is selected from the group consisting of 2% of Ni-98% Fe powder, stainless steel powder, stellite powder, tungsten carbide-cobalt powder and titanium carbide-nickel powder.

3. A method of molding powder according to claim 1, wherein said powder is selected from the group consisting of alumina, silicon carbide, silicon nitride zirconium, molybdenum carbide, tungsten carbide and titanium carbide, and a mixture of a metal powder selected from the group consisting of tungsten carbide-cobalt, titanium carbide-nickel and a ceramic powder.

4. A method of molding powder according to claim 1 wherein the main constituent of the dispersing medium is selected from the group consisting of methyl carbonate, t-butyl alcohol, stearyl alcohol and stearic acid.

5. A method of molding powder according to claim 1 wherein, while extracting said dispersing medium from said molding by a liquid or supercritical carbon dioxide, the upper limit of the pressure is 500 atmospheres and lowest pressure limit is above a lower limit pressure sufficient to maintain their phases intact.

6. A method of molding powder according to claim 1 wherein after said extraction and removal of the major constituent of said dispersing medium, a binding agent, plasticizing agent, dispersing agent, wetting agent and lubricant is added to the mixture extractable by said liquid or supercritical carbon dioxide.

7. A method of molding powder according to claim 6 wherein a binding agent selected from the group consisting of cellulose acetate butyrate, nitrocellulose, petroleum resin, polyethylene, polyacrylic ester, polymethyl methacrylate, polyvinyl alcohol, polyvinyl butyral, vinyl chloride, polymethacrylic ester, ethyl cellulose and abietic resin is added to the mixture.

8. A method of molding powder according to claim 6 wherein a plasticizing agent selected from the group consisting of butyl benzyl phthalate, dibutyl phthalate, butyl phthalate, dimethyl phthalate, methyl acetate, mixture of phthalate ester, derivatives of polyethylene glycol and tricresyl phosphate is added to the mixture.

9. A method of molding powder according to claim 6 wherein a dispersing agent selected from the group consisting of glycerin trioleate, natural fish oil, benzenesulfonic acid, oleic acid and methyl octadiene is added to the mixture.

10. A method of molding powder according to claim 6 wherein a wetting agent selected from the group consisting of alkyl aryl polyester alcohol, ethyl ether of polyethylene glycol, ethylphenyl glycol, polyoxyethylene ester, monoleic glycerin, trioleic glycerin and alcohols is added to the mixture.

11. A method of molding powder according to claim 6 wherein stearic acid or stearyl alcohol is added to the mixture as a lubricant.

* * * * *